(12) United States Patent
Zhang et al.

(10) Patent No.: US 12,722,440 B2
(45) Date of Patent: Sep. 1, 2026

(54) MULTI-STAGE ADJUSTING DAMPING VALVE, AS WELL AS SHOCK ABSORBER AND SUSPENSION SYSTEM USING DAMPING VALVE

(71) Applicant: Hefei University of Technology, Hefei (CN)

(72) Inventors: Nong Zhang, Hefei (CN); Weimin Zhong, Hefei (CN); Minyi Zheng, Hefei (CN); Tong Chen, Hefei (CN); Liang Luo, Hefei (CN); Pengfei Liu, Hefei (CN); Bin Wang, Hefei (CN)

(73) Assignee: Hefei University of Technology, Hefei (CN)

( * ) Notice: Subject to any disclaimer, the term of this patent is extended or adjusted under 35 U.S.C. 154(b) by 959 days.

(21) Appl. No.: 17/999,177

(22) PCT Filed: Jun. 7, 2022

(86) PCT No.: PCT/CN2022/097263

§ 371 (c)(1),
(2) Date: Nov. 17, 2022

(87) PCT Pub. No.: WO2022/257899

PCT Pub. Date: Dec. 15, 2022

(65) Prior Publication Data

US 2023/0398828 A1 Dec. 14, 2023

(30) Foreign Application Priority Data

Jun. 8, 2021 (CN) ......................... 202110640916.3
Aug. 18, 2021 (CN) ......................... 202110953125.6

(51) Int. Cl.
*F16F 9/50* (2006.01)
*B60G 17/018* (2006.01)
*B60G 17/06* (2006.01)

(52) U.S. Cl.
CPC ........... *B60G 17/06* (2013.01); *B60G 17/018* (2013.01); *F16F 9/50* (2013.01); *B60G 2202/24* (2013.01);
(Continued)

(58) Field of Classification Search
CPC ........................................................ F16F 9/50
See application file for complete search history.

(56) References Cited

U.S. PATENT DOCUMENTS

2019/0226545 A1* 7/2019 Schmidt ................. F16F 9/067
2019/0337584 A1* 11/2019 Walthert ................ F16F 9/466
2025/0353347 A1 11/2025 Randall

FOREIGN PATENT DOCUMENTS

CN 1132746 C 12/2003
CN 1699781 A 11/2005
(Continued)

OTHER PUBLICATIONS

International Searching Authority; International Search Report issued in PCT/CN2022/097263, 4 pages, dated Jul. 27, 2022.

*Primary Examiner* — Melody M Burch
(74) *Attorney, Agent, or Firm* — Dinsmore & Shohl LLP

(57) ABSTRACT

A multi-stage adjusting damping valve as well as a shock absorber and suspension system using the damping valve are provided. The multi-stage adjusting damping valve comprises a throttle valve, an overflow valve and a multi-stage pilot valve. The multi-stage pilot valve comprises a mechanical regulating valve and a plurality of high-speed switch electromagnetic valves having different throttle hole diameters. The damping valve is connected between a rod cavity and an oil storage cavity of the shock absorber by means of a middle cavity, and the multi-stage damping rapid regulation of the shock absorber is achieved through high-frequency opening and closing of a high-speed switching electromagnetic valve, and in comparison, the machining
(Continued)

precision, the manufacturing cost and the control and calibration difficulty of the present disclosure are greatly reduced.

12 Claims, 6 Drawing Sheets

(52) U.S. Cl.
CPC ....... *B60G 2500/11* (2013.01); *F16F 2222/12* (2013.01)

(56) References Cited

FOREIGN PATENT DOCUMENTS

| Country | Number | Kind | * | Date | Class |
|---|---|---|---|---|---|
| CN | 100364792 | C | * | 1/2008 | |
| CN | 201317237 | Y | | 9/2009 | |
| CN | 101560999 | B | | 4/2011 | |
| CN | 102069813 | B | * | 6/2012 | |
| CN | 104165205 | A | | 11/2014 | |
| CN | 104989771 | A | | 10/2015 | |
| CN | 103644248 | B | | 1/2016 | |
| CN | 106379128 | A | | 2/2017 | |
| CN | 206786073 | U | | 12/2017 | |
| CN | 108999920 | A | | 12/2018 | |
| CN | 111137095 | A | | 5/2020 | |
| CN | 111731053 | A | | 10/2020 | |
| CN | 113586645 | A | | 11/2021 | |
| CN | 217301395 | U | | 8/2022 | |
| CN | 115234598 | A | | 10/2022 | |
| CN | 115263976 | A | | 11/2022 | |
| CN | 112648320 | B | | 6/2025 | |
| DE | 2022021 | A1 | | 11/1970 | |
| DE | 7016873 | U | | 8/1972 | |
| DE | 102014005603 | A1 | * | 10/2014 | ............. B60G 17/08 |
| DE | 102015102478 | B4 | | 12/2018 | |
| DE | 102018110490 | A1 | | 11/2019 | |
| JP | H06330977 | A | | 11/1994 | |
| JP | H07133837 | A | | 5/1995 | |
| JP | H11101291 | A | | 4/1999 | |
| JP | 2001099213 | A | | 4/2001 | |
| JP | 3306526 | B2 | | 7/2002 | |
| JP | 3338531 | B2 | | 10/2002 | |
| JP | 6101179 | B2 | | 3/2017 | |
| JP | 6143517 | B2 | | 6/2017 | |
| KR | 100881081 | B1 | | 1/2009 | |
| KR | 20150121137 | A | * | 10/2015 | ................ F16F 9/50 |
| WO | WO-2016060066 | A1 | * | 4/2016 | ................ F16F 9/50 |
| WO | 2022257899 | A1 | | 12/2022 | |
| ZA | 202212357 | B | | 3/2023 | |

* cited by examiner

MULTI-STAGE ADJUSTING DAMPING VALVE, AS WELL AS SHOCK ABSORBER AND SUSPENSION SYSTEM USING DAMPING VALVE

CROSS-REFERENCE TO RELATED APPLICATIONS

This 35 U.S.C. § 371 National Stage Patent application claims priority to PCT Patent Application No. PCT/CN2022/097263, filed Jun. 7, 2022, which claims priority to and benefit of CN Patent Application Serial Number 202110953125.6, filed Aug. 18, 2021, and CN Patent Application Serial Number 202110640916.3, filed Jun. 8, 2021, all of which is incorporated by reference herein.

TECHNICAL FIELD

The present disclosure relates to the technical field of vehicle suspensions, and in particular relates to a multi-stage adjusting damping valve, as well as a shock absorber and suspension system using the damping valve.

BACKGROUND

The damping force of a vehicle shock absorber directly determines the handling stability and riding comfort of chassis suspension, but the needs of the handling stability and comfort of the automobile for damping force of suspension are often in conflict. When the damping force of the shock absorber is relatively large, the handling stability of automotive suspension is better while the riding comfort is reduced, which is suitable for conditions such as rapid acceleration, rapid braking, rapid turning, and passing through pit road surfaces, and conducive to reducing roll and pitch of automobile body and wheel runout. When the damping force of the shock absorber is relatively small, the riding comfort of the automobile is improved while the operation performance decreases correspondingly, which is suitable for rough and uneven mountain roads. Adjustable shock absorber, which can select proper damping coefficients according to changes of road conditions, vehicle speeds, loads and movement modes, not only enables the wheels to fit the road at all times, but also ensures that the vehicle body is as smooth as possible so as to achieve a balance between the handling stability and riding comfort, and is a future development direction of shock absorbers of vehicles. At present, mainstream commercial products are almost monopolized by foreign continuous damping adjusting shock absorbers, which take proportional flow valves as the core parts. Continuous change of the flow area of throttle hole is achieved through high-precision spool position control, and therefore continuous adjustment of the damping force is achieved. Although the continuous damping adjustment technology can achieve the obvious improvement of the suspension performance, such products may produce drift in the damping force over time, which make the machining accuracy, manufacturing cost, calibration difficulty and control difficulty staying at a high level. Based on these features, the continuous damping adjusting shock absorber is basically used in the middle and high-end automobiles at present.

In DE2022021A1, a shock absorber with a damping valve device is disclosed. A damping force characteristic curve of the damping valve device has at least four damping force characteristic curve regions. To this end, two damping valves connected in parallel are employed to obtain different opening characteristics and to obtain different throttling actions in the maximum open state. With such structure, the required damping force can better adapt to variety of different requirements, significantly. At present, damping-adjustable shock absorbers have been used in some high-end automobiles to make the damping force of the shock absorber be adjustable in a large range. However, due to the fact that such damping-variable actuator of the shock absorber is arranged inside the shock absorber, the structure is compact, but maintenance is inconvenient, and meanwhile, due to the adoption of a built-in structure, the requirements for the mating accuracy of the components and the control accuracy of the actuator are high, leading to machining difficult.

Therefore, on the premise of guaranteeing the performance, how to greatly reduce the use cost of the damping-adjustable shock absorber and how to improve the product reliability have become the problem urgent to be solved at present.

In addition, on the one hand, there are differences due to the understanding of those skilled in the art. On the other hand, due to the fact that the inventor studied a large amount of literature and patents when making the present disclosure, but not all the details and contents were listed in detail due to the limitation of space, however, this does not mean that the present disclosure does not have these prior art features. On the contrary, the present disclosure already has all the features of the prior art, and the applicant reserves the right to add relevant prior art to the background art.

SUMMARY

To overcome the defects in the prior art and achieve damping regulation of a vehicle suspension in a less costly and more reliable manner, the present disclosure provides a multi-stage adjusting damping valve, as well as a shock absorber and suspension system using the damping valve.

The present disclosure employs the technical solution as follows: a multi-stage adjusting damping valve comprises a throttle valve, an overflow valve, and a multi-stage pilot valve. The multi-stage pilot valve at least comprises a mechanical regulating valve and a plurality of high-speed switch electromagnetic valves which are provided in parallel. In a case that the multi-stage pilot valve receives the oil which flows in after sequentially flowing through the throttle valve and the overflow valve, a calibration value of a "differential pressure-flow" characteristic of the multi-stage pilot valve is adjusted in a manner that at least part of the oil flows through the mechanical regulating valve to compensate for assembly errors. The multi-stage pilot valve also forms a plurality of damping regulation stages in a manner of adjustably providing a plurality of high-speed switch electromagnetic valves which are connected in parallel and have different throttle hole diameters, such that the multi-stage pilot valve can provide multi-stage damping characteristics under displacement excitation. The multi-stage adjusting damping valve has the advantages that, by using the high-speed switch electromagnetic valve as regulation foundation, the multi-stage adjusting damping valve is low in cost, easy to process, rapid in response, strong in anti-pollution capacity, long in service life, incapable of producing drift after being used for a long time, and high in reliability. By setting the throttle hole diameters of different high-speed switch electromagnetic valves, the damping regulation stage can be remarkably increased with a small number of electromagnetic valves. For example, one switch valve may achieve two-stage regulation, two switch valves may achieve four-stage regulation, three switch valves may achieve eight-stage regulation, and so on. By providing the mechanical regulating valve and adjusting gaskets at the two ends of the overflow valve spring, a calibration value of the output force of a shock absorber can be adjusted, the manufacturing and assembly errors can be compensated, and differential configuration of the same series of vehicle models may be achieved. The multi-stage adjusting damping valve has the ability to adapt to different vehicle models so as to satisfy special requirements of different customers.

In accordance with some embodiments, the overflow valve comprises a valve disc and a spring. The throttle valve communicates with an oil inlet and the overflow valve in a manner of forming a flow guide channel of the oil and limiting a flowing direction of the oil. In a case that the at least part of the oil flowing into the overflow valve pushes the valve disc open and flows to an oil return branch, the rest of the oil flowing into the overflow valve flows to the multi-stage pilot valve via a through hole in the valve disc.

In accordance with some embodiments, after the oil flows into the multi-stage pilot valve, the oil, after synchronously flowing through the mechanical regulating valve and the high-speed switch electromagnetic valve in an open state, can flow to the oil return branch to converge with the oil which pushes the valve disc open and flows to the oil return branch.

In accordance with some embodiments, the mechanical regulating valve at least comprises a valve body, a spool and a throttle hole. The flux of the mechanical regulating valve is changed in a manner of adjusting the flow area between the spool and the throttle hole, such that the mechanical regulating valve can adjust a calibration value of output force thereof along with the change of the flow area, thus adjustably compensating for assembly errors.

In accordance with some embodiments, the spool is provided with at least one plugging structure. The plugging structure, in the process of moving with the spool, can at least partially extend into the throttle hole, and can be separated from the throttle hole to change the flow area between the spool and the throttle hole.

A suspension system at least comprises the multi-stage damping valve above, as well as an elastic element, a sensor, a signal processing module, and a controller. The sensor is configured to collect information such as a vehicle speed, a steering wheel angle, and a vehicle body acceleration, the information is transmitted to the controller by the signal processing module, and the controller is configured to reasonably control an open-close state of each high-speed switch electromagnetic valve according to a set control strategy. Therefore, by selectively opening at least part of high-speed switch electromagnetic valves which are connected in parallel and have different throttle hole diameters, the multi-stage pilot valve can provide different stages of damping characteristics under displacement excitation, thereby achieving the optimal performance of the vehicle suspension.

In accordance with some embodiments, the multi-stage adjusting damping valve comprises a throttle valve, an overflow valve, and a multi-stage pilot valve. The overflow valve comprises a valve disc and a spring. The multi-stage pilot valve comprises a mechanical regulating valve and a plurality of high-speed switch electromagnetic valves. The overflow valve comprises a valve disc and a spring. The throttle valve communicates with an oil inlet and the overflow valve in a manner of forming a flow guide channel of the oil and limiting a flowing direction of the oil. In a case that the at least part of the oil flowing into the overflow valve pushes the valve disc open and flows to an oil return branch, the rest of the oil flowing into the overflow valve flows to the multi-stage pilot valve via a through hole in the valve disc. The mechanical regulating valve and the high-speed switch electromagnetic valve are provided in parallel, thus the oil flowing to the multi-stage pilot valve flows to the oil return branch through the mechanical regulating valve and the high-speed switch electromagnetic valve in an open state.

In accordance with some embodiments, in a case that the multi-stage pilot valve receives the oil which flows in after flowing through the throttle valve and the overflow valve in sequence, a calibration value of a "differential pressure-flow" characteristic of the multi-stage pilot valve is adjusted in a manner that at least part of the oil flows through the mechanical regulating valve to compensate for assembly errors. The multi-stage pilot valve may also form a plurality of damp adjustment stages by adjustably providing a plurality of high-speed switch electromagnetic valves which are arranged in parallel and have different throttle hole diameters, such that the multi-stage pilot valve can provide multi-stage damping characteristics under the displacement excitation.

A shock absorber comprises a piston rod, a piston head, a bottom valve seat, a rebound valve, a flow valve, a compression valve, a compensation valve, a rod cavity, a rodless cavity, an oil storage cavity, a middle cavity, an air chamber, a housing, and oil. The upper end of the rod cavity is provided with a first oil port, the oil is able to flow to the middle cavity from the rod cavity via the first oil port. The outer wall of the middle cavity is provided with a second oil port, the second oil port is connected to the throttle valve, and the oil is able to enter the multi-stage adjusting damping valve via the second oil port. The outer wall of the oil storage cavity is provided with a third oil port, the third oil port is connected to the oil return branch, and the oil is able to flow back to the oil storage cavity from the oil return branch via the third oil port.

Figure 1:
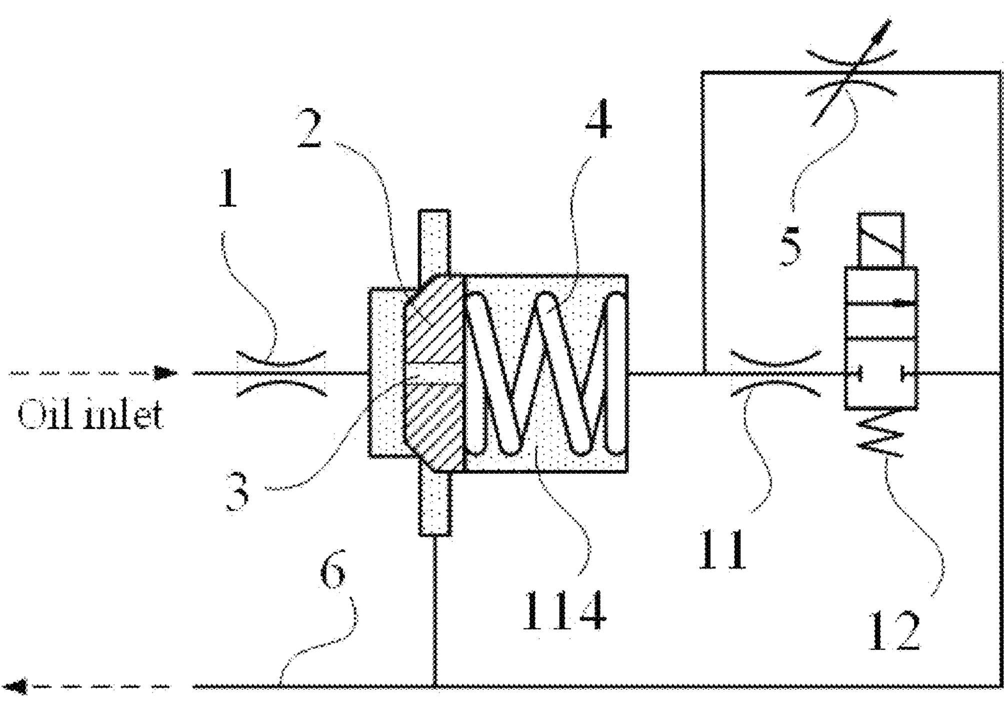
FIG. 1 is a diagram illustrating the hydraulic principle of a two-stage adjusting damping valve of an embodiment of a multi-stage adjusting damping valve as well as a shock absorber and suspension system using the damping valve in accordance with the present disclosure.

1—throttle valve; 2—valve disc; 3—through hole; 4—spring; 5—mechanical regulating valve; 6—oil return branch; 11—first throttle hole; 12—first high-speed switch electromagnetic valve; 21—second throttle hole; 22—second high-speed switch electromagnetic valve; 31—third throttle hole; 32—third high-speed switch electromagnetic valve; 51—valve body; 52—spool; 53—throttle hole; 54—plugging structure; 101—piston rod; 102—piston head; 103—bottom valve seat; 104—rebound valve; 105—flow valve; 106—compression valve; 107—compensation valve; 108—rod cavity; 109—rodless cavity; 110—oil storage cavity; 111—middle cavity; 112—air chamber; 113—housing; 114—oil; 115—first oil port; 116—second oil port; 117—third oil port.

DETAILED DESCRIPTION OF THE EMBODIMENTS

The technical solution of the present disclosure is further described below by means of specific embodiments. Those skilled in the art should understand that the embodiments described are merely to aid in the understanding of the present disclosure and should not be considered as a specific limitation of the present disclosure.

The present disclosure provides a multi-stage adjusting damping valve, which comprises a throttle valve 1, an overflow valve, and a multi-stage pilot valve which are in communication in sequence in an oil flowing direction.

In accordance with a specific embodiment, the oil flowing in from an oil inlet flows into the overflow valve through the throttle valve communicating with the oil inlet. In a case that the at least part of the oil flowing into the overflow pushes the valve disc 2 open and flows to an oil return branch 6, the rest of the oil flowing into the overflow valve flows to the multi-stage pilot valve via a through hole 3 in the valve disc 2. The throttle valve 1 is configured to adjust the flow of the oil flowing in from the oil inlet, such that the flow flowing out of the throttle valve 1 is equal to the flow flowing into the multi-stage pilot valve via the through hole 3. In a case that the multi-stage pilot valve receives the oil which flows in after flowing through the throttle valve and the overflow valve in sequence, a calibration value of a "differential pressure-flow" characteristic of the multi-stage pilot valve is adjusted in a manner that at least part of the oil flows through the mechanical regulating valve to compensate for assembly errors. The multi-stage pilot valve may also form a plurality of damp adjustment stages by adjustably providing a plurality of high-speed switch electromagnetic valves which are arranged in parallel and have different throttle hole diameters, such that the multi-stage pilot valve can provide multi-stage damping characteristics under the displacement excitation. The oil in the multi-stage pilot valve flows to the oil return branch 6 after flowing through mechanical regulating valve 5 and a high-speed switch electromagnetic valve in an open state, such that the damping characteristics with adjustable magnitude can be released according to quantity and flow actually flowing through the high-speed switch electromagnetic valve. By taking high-speed switch electromagnetic valve as an adjusting foundation, the multi-stage adjusting damping valve is low in cost, easy to process, rapid in response, strong in anti-pollution capacity, long in service life, incapable of generating drifting after being used for a long time and high in reliability. In addition, by setting the throttle hole diameters of different high-speed switch electromagnetic valves in the multi-stage pilot valve, the damping regulation stage can be remarkably increased with a small number of electromagnetic valves. For example, one switch valve may achieve two-stage regulation, two switch valves may achieve four-stage regulation, three switch valves may achieve eight-stage regulation, and so on.

Embodiment 1

Refer to FIG. 1, the multi-stage adjusting damping valve 1 comprises a throttle valve 1, an overflow valve and a multi-stage pilot valve. The overflow valve comprises a valve disc 2 and a spring 4. The multi-stage pilot valve comprises a mechanical regulating valve 5 and a first high-speed switch electromagnetic valve 12. The first high-speed switch electromagnetic valve in the embodiment is a normally-closed valve. The throttle valve 1 is connected to an oil inlet, and is connected to the overflow valve in series. A flow direction of oil is that the oil flows from the throttle valve 1 to the overflow valve, a part of the oil in the overflow valve pushes the valve disc 2 open and flows to an oil return branch 6, and the other part of the oil flows to the multi-stage pilot valve via a through hole 3 in the valve disc 2. The mechanical regulating valve 5 and the high-speed switch electromagnetic valve are provided in parallel. The oil flowing to the multi-stage pilot valve flows to the oil return branch 6 through the mechanical regulating valve 5 and the high-speed switch electromagnetic valve in an open state. For example, when the overflow valve is not opened, all oil flows back to the oil return branch 6 through the mechanical regulating valve 5, and the flow of the multi-stage pilot valve is equal to the flow of the through hole 3 as well as the flow of the oil inlet. The equal flow is achieved in a state that the overflow is not opened, that is, the oil does not push the valve disc 2 open to flow back to the branch 6, all the oil, after flowing through the hole 3 and the mechanical regulating valve 5 in sequence, flows back to the branch 6, and therefore the flow of the oil inlet is equal to the flow of the hole 3. At the moment, the damping force of the damping valve is large, presenting a "hard" damping characteristic. In a case of applying driving current, the first high-speed switch electromagnetic valve 12 is opened to increase the overflow surface. The oil flows through the first throttle hole, the pressure at the inlet of the multi-stage pilot valve and the pressure in a lower cavity of the overflow valve are properly reduced (under the same pilot flow), the valve disc 2 of the overflow valve is easier to open or the opening degree is increased, the flow of the overflow valve is obviously increased, while the pressure under the same flow is reduced, and thus the damping force becomes "soft". In contrast, the first high-speed switch electromagnetic valve 12 is closed, the overflow surface of the multi-stage pilot valve is reduced, the pilot flow becomes more difficult, the pressure at the corresponding position is increased, the overflow valve is more difficult to open or is closed, and thus the damping force becomes “hard”. As this embodiment comprises a high-speed switch electromagnetic valve, two-stage damping regulation of “hard” and “soft” can be achieved.

Embodiment 2

Figure 2:
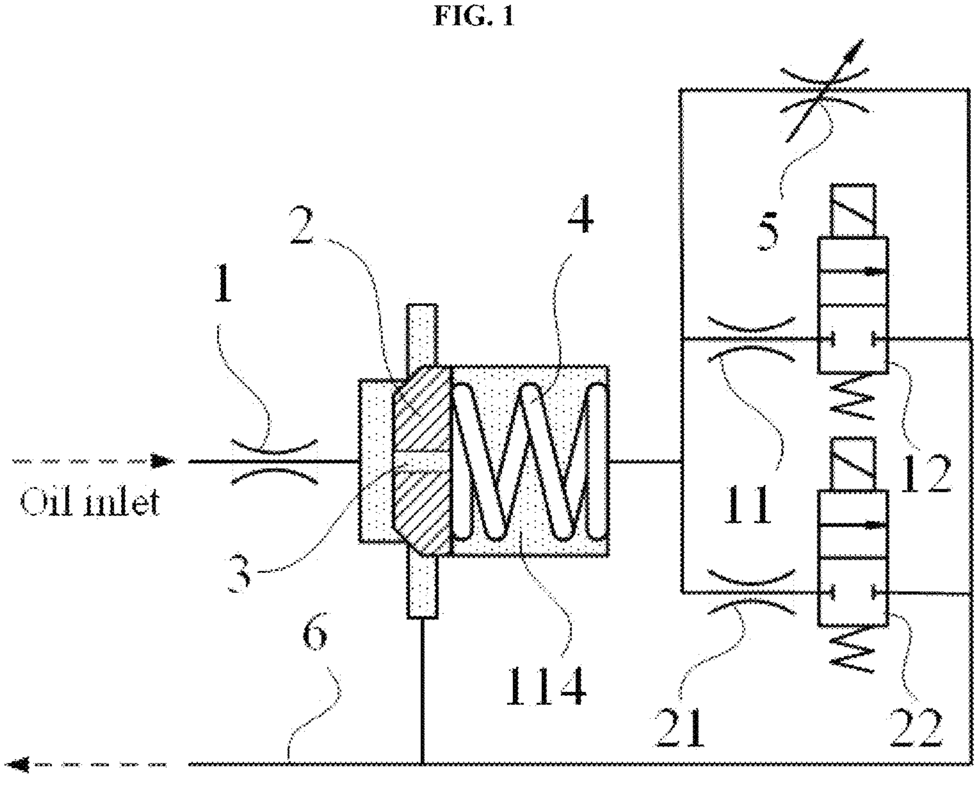
FIG. 2 is a diagram illustrating the hydraulic principle of a four-stage adjusting damping valve of an embodiment of a multi-stage adjusting damping valve as well as a shock absorber and suspension system using the damping valve in accordance with the present disclosure.

Referring to FIG. 2, a multi-stage adjusting damping valve comprises a throttle valve 1, an overflow valve and a multi-stage pilot valve. The overflow valve comprises a valve disc 2 and a spring 4. The multi-stage pilot valve comprises a mechanical adjusting valve 5, a first high-speed switch electromagnetic valve 12, and a second high-speed switch electromagnetic valve 22. The high-speed switch electromagnetic valves in this embodiment are normally-closed valves, and a hole diameter of a first throttle hole 11 is smaller than that of a second throttle hole 21. In accordance with the embodiment, two high-speed switch electromagnetic valves are included, with the damp regulation characteristics as shown in the following table.

| Damping stage | First high-speed switch electromagnetic valve | Second high-speed switch electromagnetic valve | Damping characteristic |
|---|---|---|---|
| First stage | Close | Close | Hard |
| Second stage | Open | Close | ↓ |
| Third stage | Close | Open | Soft |
| Fourth stage | Open | Open | |

Embodiment 3

Figure 3:
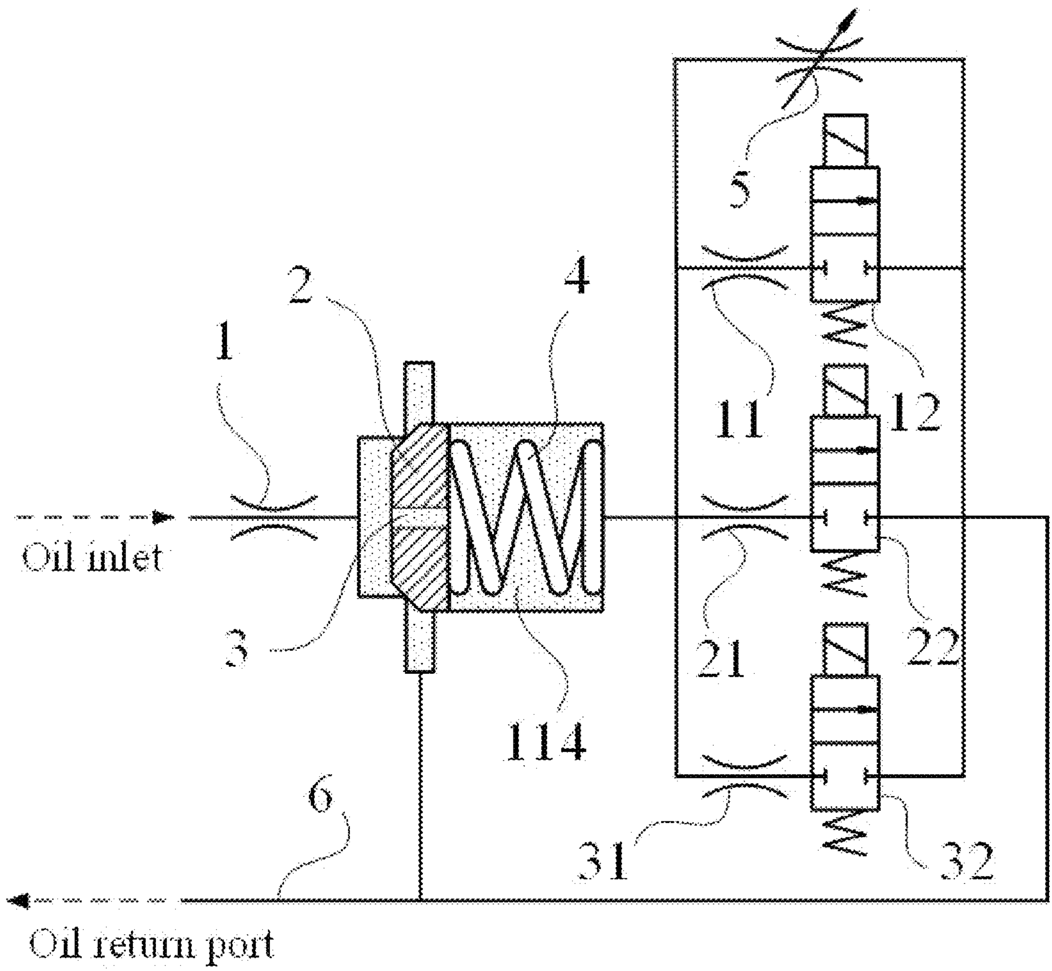
FIG. 3 is a diagram illustrating the hydraulic principle of an eight-stage adjusting damping valve of an embodiment of a multi-stage adjusting damping valve as well as a shock absorber and suspension system using the damping valve in accordance with the present disclosure.

Referring to FIG. 3, a multi-stage adjusting damping valve comprises a throttle valve 1, an overflow valve and a multi-stage pilot valve. The overflow valve comprises a valve disc 2 and a spring 4. The multi-stage pilot valve comprises a mechanical regulating valve 5, a first high-speed switch electromagnetic valve 12, a second high-speed switch electromagnetic valve 22, and a third high-speed switch electromagnetic valve 32.

Figure 8:
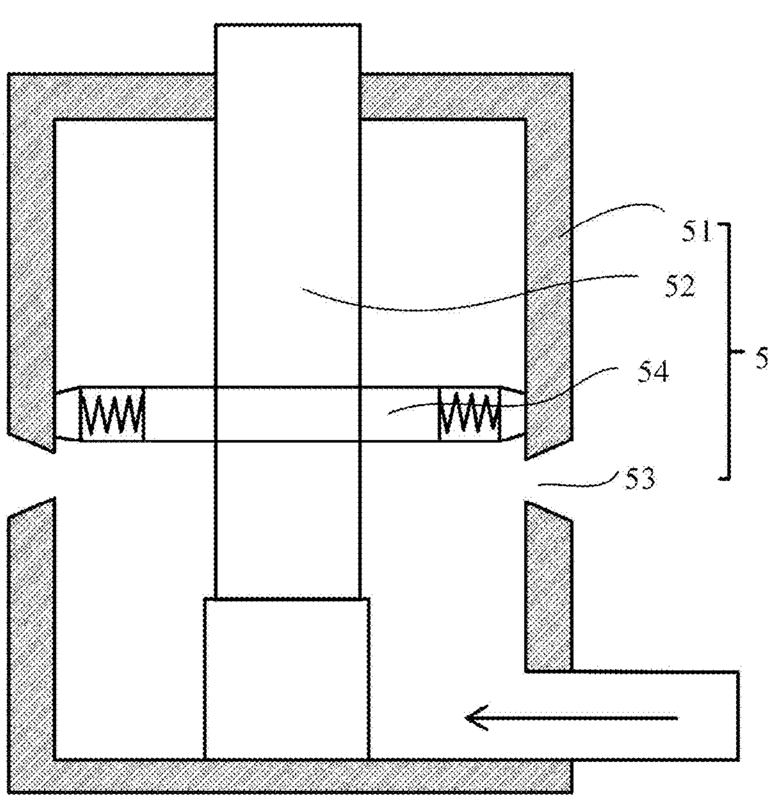
FIG. 8 is a schematic diagram illustrating a plugging structure of an embodiment of a multi-stage adjusting damping valve as well as a shock absorber and suspension system using the damping valve in accordance with the present disclosure.

As shown in FIG. 8, the mechanical regulating valve 5 at least comprises a valve body 51, a spool 52, and a throttle hole 53. The flux of the mechanical regulating valve 5 is changed in a manner of adjusting the flow area between the spool 52 and the throttle hole 53, such that the mechanical regulating valve 5 can adjust a calibration value of the output force of the multi-stage pilot valve along with the change of the flow area, thus adjustably compensating for the assembly errors. For example, the spool 52 is provided with at least one plugging structure 54. The plugging structure 54, in the process of moving with the spool 52, can at least partially extend into the throttle hole 53 and can be separated from the throttle hole 53 so as to change the flow area between the spool 52 and the throttle hole 53. The specific providing position of the throttle hole 53 on a cavity wall of the valve body 51 is not limited. In this embodiment, the throttle hole 53 is formed in the side wall of the valve body 51, and the plugging structure 54 extends out of the outer peripheral wall of the spool 52. A specific structural form of the plugging structure 54 is not limited. In this embodiment, the plugging structure 54 comprises a body and a protruded part. The body is of an annular structure formed by extending outwards in a radial direction of the spool 52. Such structural form facilitates the machining forming, and the installation between the body and the spool 5. The protruded part extends outwards from the body in a radial direction, and has an outer diameter not greater than the hole diameter of the throttle hole 53. The protruded part may enter the throttle hole 52 more sufficiently, thus plugging the throttle hole 53 at different degrees. For example, a spring connecting structure is provided between the body and the protruded part of the plugging structure 54, such that the protruded part can move in a telescopic direction of the spring to enter, or slide out of, the throttle hole 53, and can adjustably change the actual flow area of the throttle hole 53. As an alternative embodiment, the plugging structure 54 may not include the protruded part, or is a non-annular bump extending outwards in a radial direction of the spool 52. The plugging structure 54 may be integrally formed with the spool 52, or may be detachably connected to the spool. In this embodiment, the plugging structure 54 is detachably connected to the spool 52.

The high-speed switch electromagnetic valves in this embodiment are normally-closed valves. A hole diameter of a first throttle hole 11 is smaller than that of a second throttle hole 21, and the hole diameter of the second throttle hole 21 is smaller than that of a third throttle hole 31. In accordance with the embodiment, three high-speed switch electromagnetic valves are included, which can achieve eight-stage damping regulation.

Embodiment 4

Figure 4:
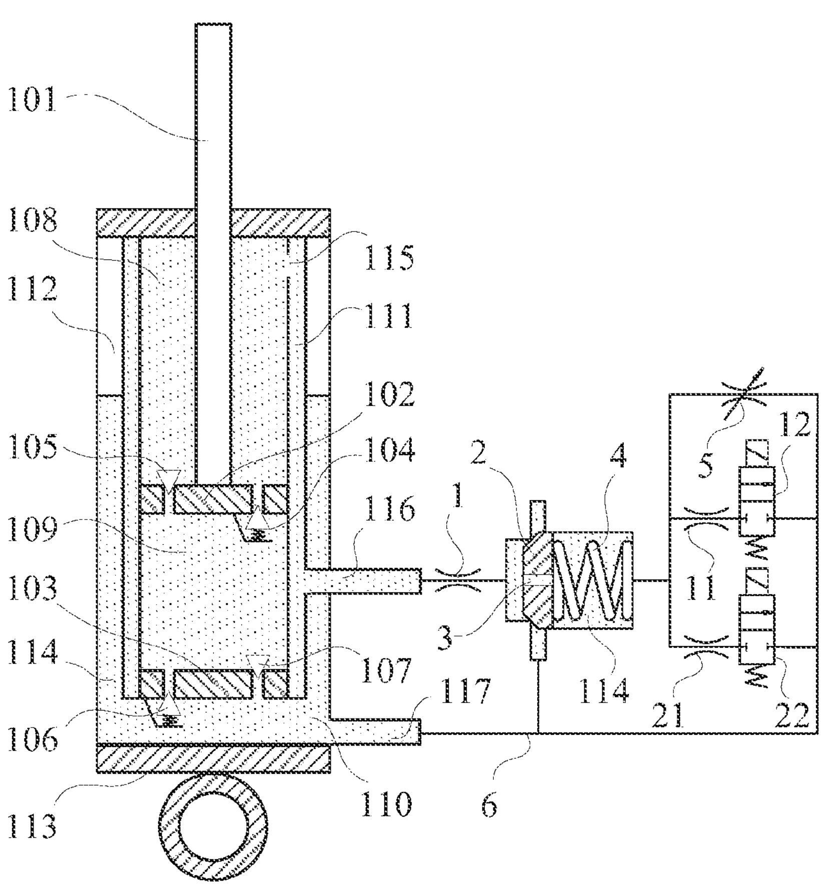
FIG. 4 is a schematic diagram illustrating the structural principle of a shock absorber using a four-stage adjusting damping valve of an embodiment of a multi-stage adjusting damping valve as well as a shock absorber and suspension system using the damping valve in accordance with the present disclosure.

Referring to FIG. 4, a shock absorber using a multi-stage adjusting damping valve is provided. In this embodiment, the four-stage adjusting damping valve is taken as an example, and thus the shock absorber is a four-stage damping adjusting shock absorber. The shock absorber comprises a four-stage adjusting damping valve, a piston rod 101, a piston head 102, a bottom valve seat 103, a rebound valve 104, a flow valve 105, a compression valve 106, a compensation valve 107, a rod cavity 108, a rodless cavity 109, an oil storage cavity 110, a middle cavity 111, an air chamber 112, a housing 113, and oil 114. The operation process of the shock absorber is divided into a rebound stroke and a compression stroke.

In the rebound stroke, the piston rod 101 moves upwards, the oil pressure in the rod cavity 108 rises, the flow valve 105 is closed, a part of the oil in the rod cavity 108 pushes the rebound valve 104 open to flow into the rodless cavity 109, and the other part of the oil flows into the middle cavity 11 via a first oil port 115, then flows into the four-stage adjusting damping valve via a second oil port 116, and finally flows back to the oil storage cavity 110 from a third oil port 117 through the four-stage adjusting damping valve. Due to the presence of the piston rod 101, the oil flowing from the rod cavity 108 is not enough to fill the increased volume of the rodless cavity 109, which causes the rodless cavity 109 to generate a certain vacuum degree, and at the moment, the oil in the oil storage cavity 110 pushes the compensation valve 107 open to flow into the rodless cavity 109 for supplementation. Throttling action of the rebound valve 104, the compensation valve 107 and the four-stage adjusting damping valve in this process jointly generate the damping force.

In the compression stroke, the piston rod 101 moves downwards, the oil pressure in the rodless cavity rises, and the oil flows through the flow valve 105 to flow into the rod cavity 108. As a part of space of the rod cavity 108 is occupied by the piston rod 101, the increased volume of the rod cavity 108 is smaller than the reduced volume of the rodless cavity 109. Due to high pre-tightening force and the opening pressure of the compression valve 106, a small part of oil pushes the compression valve 106 open to flow back to the oil storage cavity 110, and the other part of the oil flows into the middle cavity 111 via the first oil port 115 and finally flows back to the oil storage cavity 110 from the third oil port 117 via the four-stage adjusting damping valve. Throttling action of the compression valve 106, the flow valve 105 and the four-stage adjusting damping valve in this process jointly generate the damping force.

Therefore, whether the rebound stroke or the compression stroke, there is oil flowing through the four-stage adjusting damping valve, and thus the four-stage adjusting damping valve can be controlled to adjust the damping force of the shock absorber.

Figure 5:
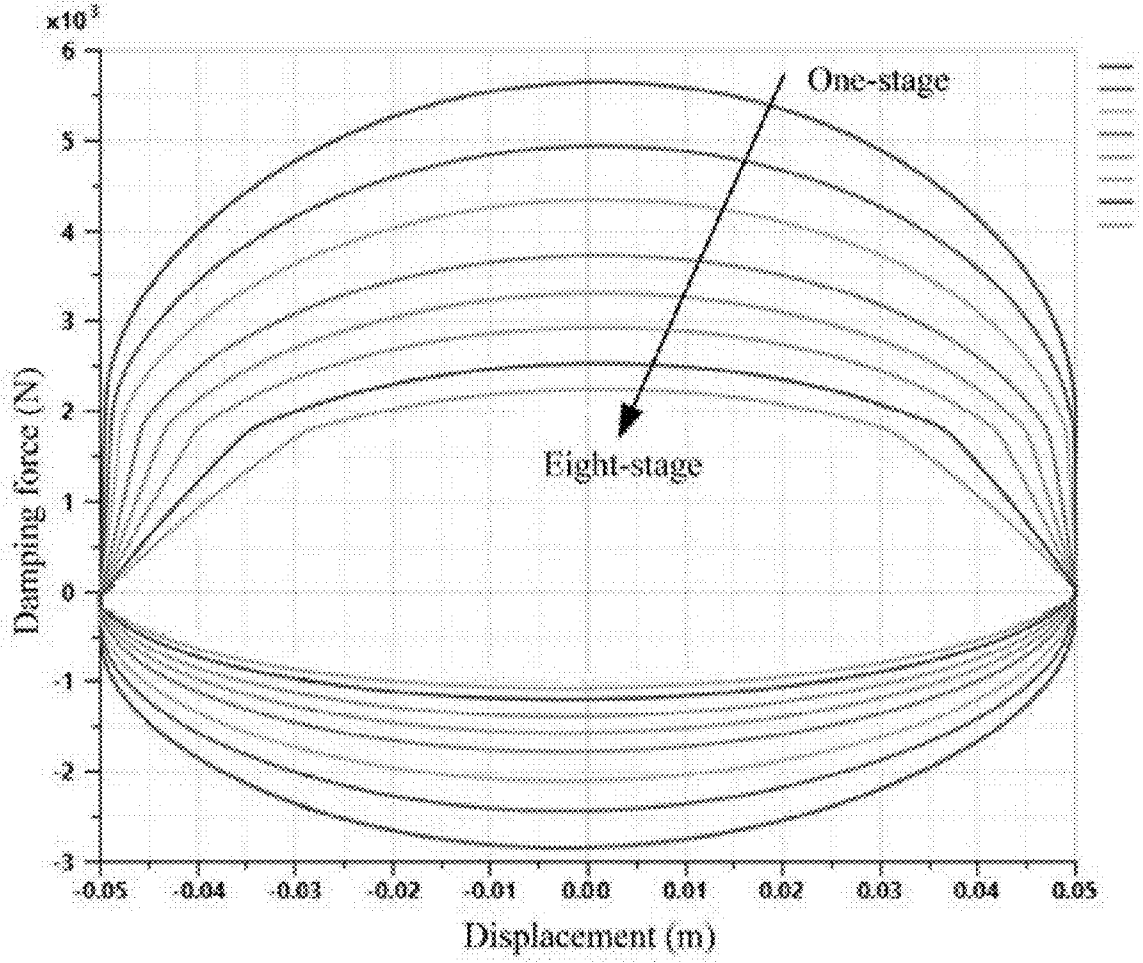
FIG. 5 is a diagram illustrating a "force-displacement" characteristic of a shock absorber using an eight-stage adjusting damping valve of an embodiment of a multi-stage adjusting damping valve as well as a shock absorber and suspension system using the damping valve in accordance with the present disclosure.

FIG. 5 is a diagram illustrating a "force-displacement" characteristic of a shock absorber using an eight-stage adjusting damping valve. The sinusoidal displacement excitation has an amplitude of ±50 mm, and a frequency of 3.34 Hz, and the hole diameters of the first, second and third throttle holes are 0.6 mm, 1.2 mm and 1.7 mm, respectively. As can be seen from the figure, under the same displacement excitation, the shock absorber achieves obvious eight-stage damping force characteristic regulation. The damping force variation range is 1080 N to 2860 N for the compression stroke and 2300 N to 5760 N for the rebound stroke. The open-close states of the three high-speed switch valves corresponding to the eight-stage damping characteristics are shown in a table below.

| Damping stage | First high-speed switch electromagnetic valve | Second high-speed switch electromagnetic valve | Third high-speed switch electromagnetic valve | Damping characteristic |
|---|---|---|---|---|
| First stage | Close | Close | Close | Hard |
| Second stage | Open | Close | Close | ↓ |
| Third stage | Close | Open | Close | Soft |
| Fourth stage | Close | Close | Open | |
| Fifth stage | Open | Open | Close | |
| Sixth stage | Open | Close | Open | |
| Seventh stage | Close | Open | Open | |
| Eighth stage | Open | Open | Open | |

Embodiment 5

Figure 6:
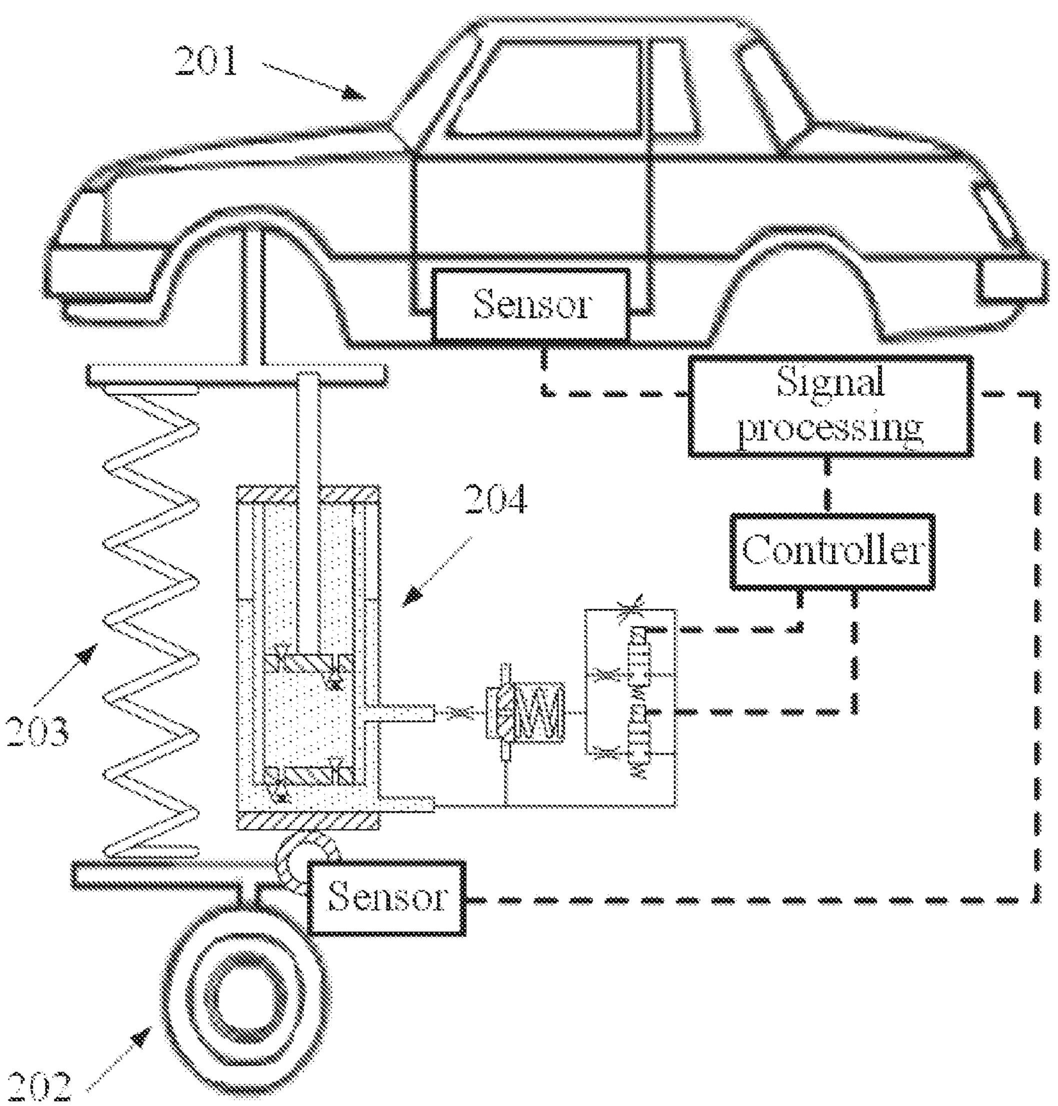
FIG. 6 is a schematic diagram illustrating a suspension system using a four-stage adjusting damping valve of an embodiment of a multi-stage adjusting damping valve as well as a shock absorber and suspension system using the damping valve in accordance with the present disclosure.

Referring to FIG. 6, a suspension system using a four-stage adjusting damping valve is taken as an example. Only the control schematic diagram of a single wheel is given in the figure, and the control schematic diagrams of the rest wheels are consistent with this. The suspension system comprises a four-stage adjusting shock absorber 204, as well as an elastic element 203, a sensor, a signal processing module and a controller. The elastic element 203 may be a coil spring or an air spring. The sensor is configured to collected information such as a vehicle speed, a steering wheel angle and a vehicle body acceleration, the information is transmitted to the controller by the signal processing module, and the controller is configured to reasonably control an open-close state of each high-speed switch electromagnetic valve according to a set control strategy, thus achieving the optimal performance of the suspension of the vehicle.

Figure 7:
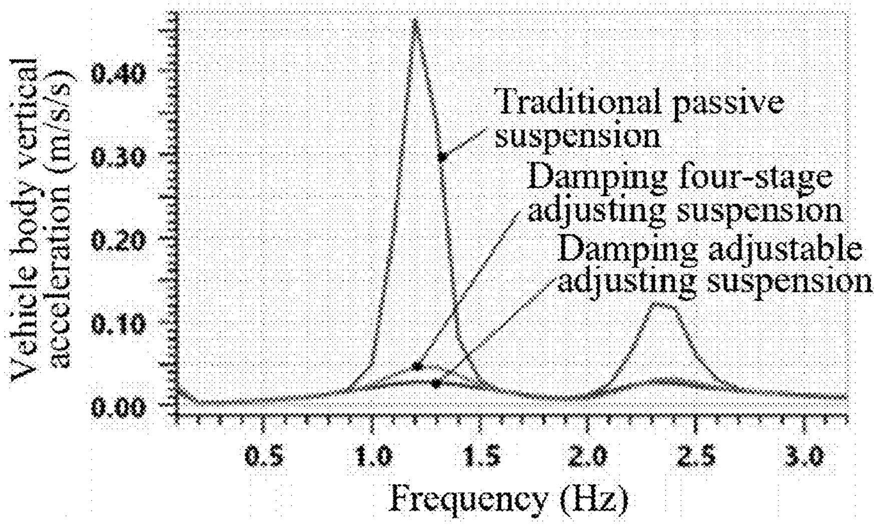
FIG. 7 is a diagram illustrating performance comparison of a suspension using a four-stage adjusting damping valve of an embodiment of a multi-stage adjusting damping valve as well as a shock absorber and suspension system using the damping valve in accordance with the present disclosure.

Referring to FIG. 7, vehicle body acceleration responses of a traditional passive suspension, a damping four-stage adjusting suspension and a continuous damping adjusting suspension are compared. As can be seen from the figure, the vehicle body acceleration of the damping-adjustable suspension is obviously lower than that of the traditional passive suspension, and the smoothness is obviously improved; meanwhile, the curve of the damping four-stage regulating suspension is much close to that of the continuous damping adjusting suspension, which proves that the damping multi-stage regulation can achieve nearly the same suspension improvement effect as the damping continuous regulation.

It needs to be noted that above specific embodiments are exemplary, and those skilled in the art, in light of the present disclosure, can devise various solutions that fall within the scope of the present disclosure and fall within the scope of the protection of the present disclosure. It will be apparent to those skilled in the art that the description and the accompanying drawings of the present disclosure are illustrative and do not constitute a limitation of the claims. The scope of protection of the present disclosure is defined by the claims and their equivalents.

What is claimed is:

1. A multi-stage adjusting damping valve, comprising:

a throttle valve, an overflow valve, and a multi-stage pilot valve;

the multi-stage pilot valve at least comprises a mechanical regulating valve and a plurality of high-speed switch electromagnetic valves which are provided in parallel;

wherein the multi-stage pilot valve receives oil which flows in after sequentially flowing through the throttle valve and the overflow valve, a calibration value of output force of the multi-stage pilot valve adjusted in a manner that at least part of the oil flows through the mechanical regulating valve to compensate for assembly errors;

the multi-stage pilot valve also forms a plurality of damping regulation stages in a manner of adjustably providing the plurality of high-speed switch electromagnetic valves which are connected in parallel and have different throttle hole diameters, such that the multi-stage pilot valve is able to provide multi-stage damping force under displacement excitation.

2. The multi-stage adjusting damping valve according to claim 1, wherein the overflow valve comprises a valve disc and a spring; the throttle valve communicates with an oil inlet and the overflow valve in a manner of forming a flow guide channel of the oil and limiting a flowing direction of the oil; wherein when the at least part of the oil flowing into the overflow valve pushes the valve disc open and flows to an oil return branch, the rest of the oil flowing into the overflow valve flows to the multi-stage pilot valve via a through hole in the valve disc.

3. The multi-stage adjusting damping valve according to claim 2, wherein after the oil flows into the multi-stage pilot valve, the oil, after synchronously flowing through the mechanical regulating valve and at least one of the plurality of high-speed switch electromagnetic valves in an open state, is able to flow to the oil return branch to converge with the oil which pushes the valve disc open and flows to the oil return branch.

4. The multi-stage adjusting damping valve according to claim 3, wherein the mechanical regulating valve at least comprises a valve body, a spool and a throttle hole; the flux of the mechanical regulating valve is changed in a manner of adjusting a flow area between the spool and the throttle hole, such that the mechanical regulating valve is able to adjust a calibration value of a differential pressure-flow characteristic of the multi-stage pilot valve along with the change of the flow area, thus compensating for assembly errors.

5. The multi-stage adjusting damping valve according to claim 4, wherein the spool is provided with at least one plugging structure, the at least one plugging structure, in the process of moving with the spool, is able to at least partially extend into the throttle hole and to be separated from the throttle hole so as to change the flow area between the spool and the throttle hole.

6. The multi-stage adjusting damping valve according to claim 5, wherein the throttle hole is formed in a side wall of the valve body, and the at least one plugging structure is able to extend out of an outer peripheral wall of the spool.

7. A suspension system, comprising:

the multi-stage adjusting damping valve according to claim 1, as well as an elastic element, a sensor, a signal processing module, and a controller, wherein the sensor is configured to collect information on a vehicle speed, a steering wheel angle, and a vehicle body acceleration, the information is transmitted to the controller by the signal processing module, and the controller is configured to control an open-close state of each of the plurality of high-speed switch electromagnetic valves according to a set control strategy; and therefore, by selectively opening at least part of the plurality of high-speed switch electromagnetic valves which are connected in parallel and have different throttle hole diameters, the multi-stage pilot valve is able to provide different stages of damping characteristics under displacement excitation.

8. The suspension system according to claim 7, wherein the overflow valve comprises a valve disc and a spring; the throttle valve communicates with an oil inlet and the overflow valve in a manner of forming a flow guide channel of the oil and limiting a flowing direction of the oil; wherein when at least part of the oil flowing into the overflow valve pushes the valve disc open and flows to an oil return branch, the rest of the oil flowing into the overflow valve flows to the multi-stage pilot valve via a through hole in the valve disc.

9. The suspension system according to claim 8, wherein after the oil flows into the multi-stage pilot valve, the oil, after synchronously flowing through the mechanical regulating valve and at least one of the plurality of high-speed switch electromagnetic valves in an open state, is able to flow to the oil return branch to converge with the oil which pushes the valve disc open and flows to the oil return branch.

10. The suspension system according to claim 9, wherein the mechanical regulating valve at least comprises a valve body, a spool and a throttle hole; the flux of the mechanical regulating valve is changed in a manner of adjusting a flow area between the spool and the throttle hole, such that the mechanical regulating valve is able to adjust a calibration value of a differential pressure-flow characteristic of the multi-stage pilot valve along with the change of the flow area, thus compensating for assembly errors.

11. The suspension system according to claim 10, wherein the spool is provided with at least one plugging structure, the at least one plugging structure, in the process of moving with the spool, is able to at least partially extend into the throttle hole and to be separated from the throttle hole so as to change the flow area between the spool and the throttle hole.

12. The suspension system according to claim 11, wherein the throttle hole is formed in a side wall of the valve body, and the at least one plugging structure is able to extend out of an outer peripheral wall of the spool.

* * * * *